(12) United States Patent
Dongre

(10) Patent No.: US 11,142,667 B2
(45) Date of Patent: *Oct. 12, 2021

(54) ASPHALT ADDITIVE COMPOSITIONS AND METHODS OF MAKING AND USING THEREOF

(71) Applicant: Dongre Laboratory Services, Inc., Fairfax, VA (US)

(72) Inventor: Rajendra Nidhish Dongre, McLean, VA (US)

(73) Assignee: Dongre Laboratory Services, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,177

(22) Filed: Sep. 30, 2019

(65) Prior Publication Data

US 2020/0024480 A1 Jan. 23, 2020

Related U.S. Application Data

(63) Continuation of application No. 15/970,309, filed on May 3, 2018, now Pat. No. 10,544,331, which is a
(Continued)

(51) Int. Cl.
*C09D 195/00* (2006.01)
*E01C 7/18* (2006.01)
(Continued)

(52) U.S. Cl.
CPC .......... *C09D 195/005* (2013.01); *C08L 95/00* (2013.01); *E01C 7/18* (2013.01);
(Continued)

(58) Field of Classification Search
CPC .................. C08L 2555/22; C08L 2555/34
See application file for complete search history.

(56) References Cited

U.S. PATENT DOCUMENTS

| 4,271,213 A | 6/1981 | Grimm et al. |
| 6,214,236 B1 | 4/2001 | Scalliet |

(Continued)

FOREIGN PATENT DOCUMENTS

| JP | 002780789 | 8/1992 |
| WO | 2014029372 | 2/2014 |

OTHER PUBLICATIONS

Amdouni et al., "Epoxy Composites Based on Glass Beads. I. Viscoelastic Properties", Journal of Applied Polymer Science, vol. 45, No. 10, Aug. 5, 1992, pp. 1799-1810.
(Continued)

*Primary Examiner* — Alexandre F Ferre
(74) *Attorney, Agent, or Firm* — RatnerPrestia

(57) ABSTRACT

A composition useful as an asphalt additive includes a plurality of substrate particles and a coating layer disposed on the particles, the coating layer including a solid elastomer. A method of producing an asphalt additive includes mixing an emulsion comprising an elastomer with a plurality of substrate particles. Another composition useful as an asphalt additive includes a plurality of substrate particles substantially coated with a first coating layer and a second coating layer, the first coating layer including a solid elastomer. An asphalt mix includes the asphalt additive composition, aggregate, and a binder.

11 Claims, 18 Drawing Sheets

Related U.S. Application Data continuation of application No. 14/939,575, filed on Nov. 12, 2015, now Pat. No. 10,308,839.

(60) Provisional application No. 62/078,703, filed on Nov. 12, 2014.

(51) Int. Cl.
  *C08L 95/00* (2006.01)
  *C09D 109/08* (2006.01)
  *C08L 19/00* (2006.01)

(52) U.S. Cl.
  CPC ......... *C08L 19/003* (2013.01); *C08L 2555/22* (2013.01); *C08L 2555/34* (2013.01); *C08L 2555/84* (2013.01); *C09D 109/08* (2013.01); *Y02A 30/30* (2018.01)

(56) References Cited

U.S. PATENT DOCUMENTS

| | | |
|---|---|---|
| 2003/0149185 A1 | 8/2003 | Wang et al. |
| 2005/0284333 A1 | 12/2005 | Falkiewicz |
| 2014/0000214 A1 | 1/2014 | Vasquez et al. |
| 2014/0013693 A1 | 1/2014 | Zhou et al. |
| 2014/0329938 A1 | 11/2014 | Coe |
| 2015/0184026 A1 | 7/2015 | Rangel et al. |

OTHER PUBLICATIONS

International Preliminary Report on Patentability for International Application No. PCT/US2015/060316, dated May 16, 2016, 9 pages.
International Search Report and Written Opinion for International Application No. PCT/US2015/060316, dated Jan. 29, 2016, 17 pages.
Non Final Office Action for U.S. Appl. No. 14/939,575, dated Nov. 4, 2016, 8 pages.
Non Final Office Action for U.S. Appl. No. 14/939,575, dated Jul. 14, 2017, 10 pages.
Notice of Allowance for U.S. Appl. No. 14/939,575, dated Feb. 9, 2018, 11 pages.
Notice of Allowance for U.S. Appl. No. 14/939,575, dated Mar. 25, 2019, 7 pages.
Partial Supplementary European Search Report for European Application No. 15858510.9, dated May 24, 2018, 12 pages.
Underwood et al., "Simplified Viscoelastic Continuum Damage Model as Platform for Asphalt Concrete Fatigue Analysis," pp. 36-45, vol. 2296, Transportation Research Record, Transportation Research Board, Washington, DC (abstract only).
Entire patent prosecution history of U.S. Appl. No. 14/939,575, filed Nov. 12, 2015, entitled, "Asphalt Additive Compositions and Methods of Making and Using Thereof," now U.S. Pat. No. 10,308,839, issued Jun. 4, 2019.
Entire patent prosecution history of U.S. Appl. No. 15/970,309, filed May 3, 2018, entitled, "Asphalt Additive Compositions and Methods of Making and Using Thereof."
Non Final Office Action for U.S. Appl. No. 15/970,309, dated Oct. 19, 2018, 14 pages.
Final Office Action for U.S. Appl. No. 15/970,309, dated May 1, 2019, 8 pages.
Notice of Allowance for U.S. Appl. No. 15/970,309, dated Sep. 16, 2019, 6 pages.

200

210 → Mix asphalt additive with asphalt binder to form asphalt composition.

220 → Apply asphalt composition to a surface to form a sealed surface.

230 → Place a layer of aggregate over sealed surface.

310 → Mix emulsion including an elastomer with a plurality of substrate particles

410 → Combine asphalt additive with aggregate and asphalt binder.

FIG. 4

ASPHALT ADDITIVE COMPOSITIONS AND METHODS OF MAKING AND USING THEREOF

CROSS REFERENCE TO RELATED APPLICATIONS

This application is a Continuation of U.S. application Ser. No. 15/970,309, filed May 3, 2018, which is a continuation of U.S. Pat. No. 10,308,839, issued Jun. 4, 2019, U.S. application Ser. No. 14/939,575, filed Nov. 12, 2015, which claims priority to U.S. Provisional Application No. 62/078,703, filed Nov. 12, 2014. The contents of each of these applications being incorporated by reference in their entireties herein for all purposes

TECHNICAL FIELD

The invention relates to asphalt additives that can be combined with aggregate and asphalt binder.

BACKGROUND OF THE INVENTION

Asphalt roads are made using asphalt mixtures. Asphalt mixtures contain mineral aggregate, natural or manufactured sand and hot asphalt (called a binder) blended together, sometimes with other additives. The mix is transported to a road construction site, and the asphalt mixture is placed on a prepared road bed in a uniform layer. The layered asphalt mix is compacted in place until a certain prescribed density is obtained. After cooling, the compacted road surface becomes a long-lasting, stable surface capable of supporting a wide range of vehicles.
Asphalt Failure Roads and highways constructed from asphalt mixtures are designed by pavement engineers to resist traffic loads and environmental extremes usually for 20 years of pavement performance without failure. The design process starts with the determination of a layered load bearing structure consisting of unbound layers as well as bound (asphalt mixture) layers. The mineral aggregate with a pre-designed gradation is then mixed with asphalt binder with or without polymers to produce a material capable of resisting traffic loads and environmental forces. However, pavements do fail for a variety of reasons. There are five areas of potential pavement distress that can lead to pavement failure: fatigue cracking, rutting, thermal cracking, friction, and moisture susceptibility. All of these distresses can result in loss of pavement performance thereby reducing the life cycle costs. Highway engineers specify mix designs that maximize the life of the pavement while minimizing the life-cycle cost of the road surface.

Repeated slow moving traffic loads cause accumulation of longitudinal (in the direction of traffic) wave like undulations called Rutting (or permanent deformation). Rutting deformation may accumulate in both the bound (asphalt mix layer) and the unbound layers of the pavement structure. This can occur for many reasons, including weak subgrade, and an unbound base course and problems with asphalt mixture design. The focus of this effort is permanent deformation, fatigue cracking, low-temperature cracking, moisture damage and friction pavement performance issues caused by asphalt mix problems. Permanent deformation is caused by consolidation and/or lateral shear deformation of the material in the asphalt mix layer under slow moving traffic. Shear deformation of the asphalt mixture generally occurs in the top 100 mm of the pavement surface, but it can occur deeper in pavement if properly designed asphalt mixture is not used. The mechanism by which rutting occurs is a combination of densification (decrease in volume and, hence, increase in density of the pavement) and shear deformation. Research literature suggests that rutting is mainly caused by deformation shear flow rather than densification volume change.

Fatigue cracking—often called alligator cracking—manifests itself as longitudinal cracks in the pavement surface that resemble the back of an alligator skin. This cracking initiates at the bottom of the bound asphalt mix layer due to repeated tensile strains caused by traffic loads (both slow and fast moving). The mechanism of fatigue cracking is similar to rutting in which the strains are accumulated to cause distress. The tensile strains accumulate to cause cracks when the material's ability to withstand the tensile strains is exceeded. Fatigue cracking is often associated with loads which are too heavy and/or frequent and exceed the pavement design limits. The cracks allow water to drain to the lower unbound layers and when coupled with inadequate pavement drainage can make the problem worse. Upper asphalt mix layers experience high strains when the underlying layers are weakened by excess moisture and can fail prematurely from fatigue. Fatigue cracking can lead to the development of potholes (asphalt mix pieces separate from each other when the cracks connect and are dislodged from the pavement surface). Fatigue cracking generally occurs on thin pavements where are potholes are more severe.

Fatigue cracking is generally considered to be more of a structural problem than just a material problem. However, if the asphalt mixture is adequately designed using high tensile strain resistant polymer or crumb rubber modified binders that can flex without cracking, even weak pavement structures will perform adequately. Fatigue cracking is caused by an interaction of number of pavement factors: heavy traffic loads and poor subgrade drainage combined with poorly designed, high-deflection pavements.

In the past, fatigue cracking was generally accepted to initiate from the bottom and migrate toward the surface, but fatigue cracks have also been observed starting at the surface and migrating downward in asphalt pavements. There is another form of cracking that manifests itself as transverse cracks (transverse to the traffic direction). These are called thermal or low-temperature cracks. Low temperature cracking of asphalt pavements is attributed to tensile strain induced in hot mix asphalt as the temperature drops to some critically low level. Low temperature cracking is caused by low pavement temperatures and influenced by traffic loads. As the pavement shrinks due to rapid drop in temperature, tensile strains build within the layer. At consistently spaced locations along the pavement, the tensile stress exceeds the tensile strength and the asphalt layer cracks. Low temperature cracks often occur from a single low temperature event, but they can also result from the cumulative effect of many freeze-thaw cycles. These cracks start at the surface and work their way downward. The mixture low-temperature strength, which is primarily related to the properties of the asphalt binder, is probably the greatest contributor to low-temperature cracking.

Moisture damage is also considered to be a major distress affecting asphalt pavements. The mechanism of moisture damage failure is creation of high tensile strain pockets in the asphalt layer due to loss of fine aggregate in the underlying unbound layers caused by poor drainage of the water ingresses from fatigue cracks. Moisture damage may also result from binder stripping from the mineral aggregate due to failure of adhesive bond or dissolution of the binder film or both.

Asphalt binder is produced by fractional distillation of crude oil. The lighter molecules of the crude oil are separated and used to manufacture such products as aviation fuel, gasoline and diesel fuel. Heavier lubricants are also removed, as are heavier fuel oils, until the leftovers are a near-solid pitch-like bottom byproduct. Due to high cost of gas used in cars and airplanes, refiners prefer distilling crudes that have abundance of lighter molecules thereby reducing the heavier bottom content that is turned into asphalt. New sources of crude oil like heavy, sour crudes from the Alberta Tar Sands and Orinoco River Valley are finding their way into the markets, thus modifying the crude mixes used to produce refined oil products. Along with changes in refining and increasing crude costs, asphalts today are experiencing a gradual decline in quality. In general, the asphalt of today does not function optimally in producing a lasting road surface unless it is modified as a physical composite or a chemically formulated material. Two of those methods of modifying/formulating asphalt binder are (1) asphalt modification with elastomeric polymers and (2) asphalt modification with recycled crumb rubber.

Testing of Asphalt Binders

Given the extended life of some asphalt roads, it may take fifteen or more years to observe the effects of a new additive or mix design in the field. In order to reduce the time required to assess the performance of any specific mix designs, the industry is constantly developing and deploying lab testing methods designed to forecast the expected future performance of a mix design. Some of the more prominent testing procedures in common use in the US involve evaluations of the binder performance or evaluation of the actual asphalt mix design. Frequently used binder tests include: (1) PG Grading as part of the US Superpave Program (AASHTO M320), (2) the Multiple Stress Creep Recovery (MSCR) Test (ASTM 07405) and (3) the m Value BBR Test (AASHTO M313 and ASTM D6648). Frequently used mix performance assessment laboratory tests include: (1) Hamburg Wheel Tracking Test (AASHTO M323 and AASHTO M332) and (2) Mixture Fatigue Testing (AASHTO T321 and S-VECD testing), Dynamic Modulus and Flow Number Testing using the AMPT (AASHTO TP79), Low-temperature cracking resistance testing for asphalt binders using the BBR (AASHTO T313) and the Direct Tension Test (AASHTO T316) and for mixtures using the TSRST test.

PG Grading as a part of the US Superpave Program is based on the idea that asphalt binder properties should be related to the climatic and traffic conditions under which they are used. PG-graded asphalt binders are selected to meet expected climatic conditions as well as aging considerations with a certain level of reliability. Therefore, the PG system uses a common set of tests to measure binder physical properties that can be directly related to field performance of the pavement at extreme temperatures. A binder graded by the PG system should meet all specified criteria by this common set of tests.

The Rotational Viscometer (RV) test is used to evaluate the pumping ability of the asphalt binder at the asphalt plant. The Dynamic Shear Rheometer (DSR) tests with different levels of aging are used to evaluate the binder rutting resistance properties at high service temperature and fatigue resistance at intermediate service temperature. The Bending Beam Rheometer (BBR) and Direct Tension Test (DTT) with short plant induced and long term in service aging are used to evaluate the binder properties under low temperature, which are indicative of the likelihood that the binder will crack under stress at low temperatures. The Rolling Thin Film Oven (RTFO) aging is used to simulate the short-term aging of the asphalt binder during the construction phase, including the mixing, silo, transportation and lay down etc. The Pressure Aging Vessel (PAV) aging is used to simulate the long-term aging of the asphalt binder after the AC pavement is in service about 8 to 10 years.

The PG grading system is based on climate, so the grade notation consists of two portions: high and low pavement service temperature. The major concern for high temperature performance is rutting, which typically takes time to accumulate; therefore, an average of 7 day maximum pavement temperature is used for describing the high temperature pavement climate. On the low temperature side, thermal cracking can happen during one really cold night; therefore the minimum pavement temperature is used for describing the low temperature climate. For both high and low temperature grades, PG is reported in 6° C. increments. The average 7 day maximum pavement temperature typically ranges from 46 to 82° C., and minimum pavement temperature typically ranges from −46° C. to −10° C.

A binder identified as PG 64-10 must meet performance criteria at an average 7 day maximum pavement temperature of 64° C. and also at a minimum pavement temperature of −10° C. The maximum pavement temperature is typically higher than the air temperature by about 20° C. since the dark color pavement absorbs the heat and retains it. The maximum pavement temperature is typically measured at about 1 inch below the pavement the surface. However, the minimum pavement temperature occurs on the surface of the pavement and is equal to the air temperature.

The common minimum reliability used is 98%, so that means when the PG 64-10 binder is selected, the asphalt binder in the AC pavement should perform satisfactorily under normal traffic condition at the location where the extreme pavement temperatures are within the range of −10° C. and 64° C. throughout its service life with a minimum 98% confidence level. Where the traffic condition is not typical, such as the really heavy traffic like an interstate highway, or slew traffic like a bus stop or intersection area, one or two grades stiffer asphalt binder may be used to help prevent a rutting problem.

The Multiple Stress Creep Recovery (MSCR) test is a prominent and widely used improvement to the Superpave Performance Graded (PG) Asphalt Binder specification. This new test and specification provide the user with a new high temperature binder specification that more accurately indicates the rutting performance of the asphalt binder and is blind to modification. A major benefit of the new MSCR test is that it eliminates the need to run tests such as elastic recovery, toughness and tenacity, and force ductility, procedures designed specifically to indicate polymer modification of asphalt binders. A single MSCR test can provide information on both performance and formulation of the asphalt binder.

The MSCR test uses a creep and recovery test concept to evaluate the binder's potential for permanent deformation. Using the Dynamic Shear Rheometer (DSR), the same piece of equipment used today in the existing PG specification, a one-second creep load is applied to the asphalt binder sample. After the 1-second load is removed, the sample is allowed to recover for 9 seconds. The test is started with the application of a low stress (0.1 kPa) for 10 creep/recovery cycles then the stress in increased to 3.2 kPa and repeated for an additional 10 cycles.

The material response in the MSCR test is significantly different than the response in the existing PG tests. In the PG system, the high temperature parameter, G*/sind, is measured by applying an oscillating load to the binder at very low strain. Due to the low strain level, the PG high temperature parameter doesn't accurately represent the ability of polymer modified binders to resist rutting.

Under the very low levels of stress and strain present in dynamic modulus testing, the polymer network is never really activated. In the existing PG specification, the polymer is really only measured as a filler that stiffens the asphalt. In the MSCR test, higher levels of stress and strain are applied to the binder, better representing what occurs in an actual pavement. By using the higher levels of stress and strain in the MSCR test, the response of the asphalt binder captures not only the stiffening effects of the polymer, but also the delayed elastic effects (where the binder behaves a bit like a rubber band).

The relationship between rutting and the results from MSCR testing was verified by FHWA through their ALF process and with test sections on I-55 in Mississippi. In 1996, Mississippi DOT (Department of Transportation) built several test sections on I-55. Multiple modifiers were used in the sections, including SBS, SB, SBR, and crumb rubber, with a control section of unmodified (neat) asphalt binder. Rutting was monitored for six years. The findings from both studies indicated that the MSCR parameter, Jnr, correlated much better to rutting then the PG parameter, G*/sin d.

The MSCR test does a better job of identifying the rut resistance of both neat and polymer modified binders, but some highway agencies still want to make sure that the polymer is in the binder for other purposes such as crack resistance and durability. Here the MSCR test provides great improvements over the existing tests like the elastic recovery and toughness and tenacity. Data from the exact same sample from the MSCR test that was used to do high temperature grading provides information on the polymer modification as well. The one test provides the high temperature grade and quality of polymer modification eliminating the need to run additional tests like elastic recovery on additional samples. The compliance value Jnr from the MSCR test provides the rut resistance and the amount of recovered strain from the test identifies the presence of polymer and also the quality of the blending of the polymer in the binder.

AASHTO M320 currently does not have a specification on items such as Elastic Recovery or any of the currently used SHRP+tests. In keeping with their current practice, no actual specification was developed for the % Recovery in the MSCR test. Recommendations on minimum MSCR % Recovery are part of the TP 70 test procedure for MSCR.

The Multi-Stress Creep and Recovery Test was developed to replace the existing RTFOT DSR high temperature Superpave requirement. It has been to shown to be far more discriminating in identifying the rutting potential of both modified and neat binders. The MSCR has been used to test and successfully rank neat, SBS, SB, Elvaloy (terPolymer), CRM, latex and chemically modified binders. The same simple test procedure to determine the high temperature test can also be used to evaluate the presence of polymer modification in the binder eliminating the need to run other time consuming, less discriminating test methods. Although jurisdictions can use their own MSCR threshold standards, many call for MSCR recovery values in excess of 35% in order for a pavement to test as acceptably rut resistant.

m-Value from BBR test and phase angle value from the DSR test—Low temperatures cause an asphalt binder to become very stiff with low resistance to movement. Tensile stresses from movement can exceed the tensile strength of the asphalt pavement, leading to cracking. To prevent low temperature cracking, the PG binder specification uses a maximum creep stiffness (S) of 300 MPa. The S value is determined through a procedure involving use of a bending beam rheometer (BBR). A second BBR measurement is the m value. The m value represents the rate of change in the creep stiffness in a binder sample versus time. The m value is obtained by measuring the stiffness of an asphalt binder beam at several times after application of a standard load to the beam. The m value is the slope of the curve of log stiffness versus log time, and the slope expresses the rate of binder stiffness change over time in cold conditions. A high m value is desired because a pavement in cold conditions will contract, and a less stiff binder in cold temperatures will resist cracking. The PG binder specification requires that the m value be greater than or equal to 0.300 at 60 s loading time at low service temperature+10° C. A lower phase angle measured using the DSR also provides additional support to the elasticity of the mix and impacts the rutting and cracking performance in the field as shown by numerous research studies.

The Hamburg Wheel Tracking Test examines the susceptibility of asphalt surfaces to rutting and moisture damage. The test uses a steel wheel with weight that rolls over the sample in a heated water bath. A designated number of passes (20,000 is common) are performed on the sample. The rut depth is measured by the machine periodically, usually every 20, 50, 100 or 200 passes. 20,000 passes can take around 6.5 hours whereas the entire test can take around 3 days. Several analytics are examined with the Hamburg Wheel Tracking Test including post-compaction consolidation, creep slope, stripping inflection point, and stripping slope.

Studies have found that there is good correlation between the Hamburg test and field performance but it has also been determined that the test can fail to differentiate between some mixtures.

Fatigue Testing of binders and mixtures—Several test methods are under development to assess the fatigue resistance of asphalt binders. The most promising among them is the DENT test being developed by FHWA at the TFHRC research labs. Recently AASTO has approved it as a provisional standard. Fatigue distress of the pavement is mostly an asphalt mixture material fatigue resistance issue more than the binder's fatigue resistance. With that in mind, the S-VECD pull-pull fatigue testing is currently being developed to test mix fatigue resistance. The bending beam fatigue test (AASHTO M321) is also widely used to assess fatigue resistance of asphalt mixes. The pull-pull test is however easier to use and produces results with relatively less time and effort as compared with the bending beam mix fatigue test.

Polymer Modification of Asphalt

Polymer modification of asphalt involves the addition of mostly elastomeric polymers (SBS, SB, SBR etc.) to asphalt binders for the purposes of creating an asphalt binder capable of resisting tensile strains due to cross-linking of polymer molecules. The two lead additives for polymer modification are SBS (Styrene Butadiene Styrene) and SBR (Styrene Butadiene Rubber). These additives are added in hot asphalt liquid, heated and mixed with a shearing mixer at an asphalt terminal before transport to an asphalt pavement manufacturer for inclusion in various pavement designs.

About 10-15% of all domestic hot and warm mix asphalt is modified with polymers. Virtually all polymer modified asphalt (PMA) uses SBS (85% of the market) or SBR (10% of the market). Modified asphalt pavements are typically used in high-stress applications like interstate expressways and roads supporting heavy industrial traffic.

The SuperPave system classifies asphalt binders based on their ability to survive varying use climates and varying loadings. Standard binders would have a Performance Grading (PG) classification of 64-22. Polymer modified binders typically are designed to meet a PG 76-22 standard, which generally means they will resist rutting and cracking better than a PG 64-22 binder. Polymer modification of asphalt can extend road life by 35% or more.

Rubber Modified Asphalt

The primary source of crumb rubber in the US is from recycled used auto and truck tires. The tires are chopped into smaller pieces, the belts are removed, and the chipped tires are reduced to progressively smaller crumbs. In 1990, the federal government mandated the use of crumb rubber as a partial replacement for asphalt binder. Asphalt binder with more than 5% rubber content becomes more resistant to rutting, and can resist cracking as well. Early experiments with rubber additions to asphalt did not go well, and there were a number of quality-related problems in the industry. The federal mandate was rescinded after a few years. Several states continued to work on the problem, and Arizona developed a process for rubber addition that was successfully deployed. The Arizona "Wet Method" modified binders with as much as 15 to 20% crumb rubber, and the resultant roads were very effective in reducing rut and crack problems, not to mention other benefits. The wet process has a few drawbacks, however. The rubber has to be cooked or digested into the binder for an hour or more at high temperatures before use. With higher levels of rubber additions, the hot mix asphalt is very sticky and difficult to lay and compact. Modification is typically performed either at an oil terminal or at a larger asphalt production facility. Blending and cooking processes require a separate processing, pumping and storage tank, which can be expensive. If the modified asphalt is stored for any length of time, it has to be agitated in order to keep the crumb rubber properly diffused in the mix. Finally, the cooking process tends to require more energy in order to produce a ton of hot mix. In spite of those drawbacks, the wet process produces excellent roads that are as durable (or more durable) than polymer modified asphalts.

When a CRM asphalt binder is subjected to some of the binder and mix tests discussed earlier, the results are very encouraging. With the addition of 10% or more rubber, the modified binders typically showed PG ratings in the 82-22 range. The mix designs had no trouble passing mix testing requirements set by various DOTs (Departments of Transportation), and depending on the starting binders used, MSCR values of more than 35, and passing m values were common. Both lab and field results suggest that both wet mix asphalt and the dry process or plant mix asphalt are both viable methods for asphalt mixture modification for paving and other related applications.

SUMMARY OF THE INVENTION

Aspects of the invention relate to asphalt additive compositions, asphalt mixtures, and methods of making and using the same.

In accordance with one aspect, the invention provides a composition. The composition includes a plurality of substrate particles and a coating layer disposed on the particles. The coating layer includes a solid elastomer. The coating layer may be a full or partial layer. The composition may also be viewed as a plurality of substrate particles and a solid elastomer adhered to the particles.

In accordance with another aspect, the invention provides an asphalt mixture including the inventive composition, aggregate, and asphalt binder.

In accordance with yet another aspect, the invention provides a method of producing a chip seal surface. The method includes the steps of mixing a composition comprising a plurality of substrate particles and a coating layer disposed on the particles, the coating layer comprising a solid elastomer, with an asphalt binder to form an asphalt composition; applying the asphalt composition to a surface to form a sealed surface; and placing a layer of aggregate over the sealed surface.

In accordance with still another aspect, the invention provides a method of producing an asphalt additive. The method includes the step of mixing an emulsion comprising an elastomer with a plurality of substrate particles.

In accordance with another aspect, the invention provides a method of producing an asphalt mixture. The method includes the step of combining any of the inventive compositions described herein with aggregate and asphalt binder.

In accordance with still another aspect, the invention provides a method of paving a surface. The method includes the steps of applying any of the inventive asphalt mixtures described herein to the surface; and compacting the asphalt mixture on the surface.

In accordance with yet another aspect, the invention provides a crack sealant asphalt binder including any of the inventive compositions described herein.

In accordance with still another aspect, the invention provides a roofing asphalt binder including any of the inventive compositions described herein.

In accordance with yet another aspect, the invention provides a composition. The composition includes a plurality of substrate particles substantially coated with a first coating layer, a second coating layer, and a third coating layer, the first coating layer including a solid elastomer.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 2 is a flow chart depicting selected steps of a method of producing a chip seal surface in accordance with aspects of the present invention;

FIG. 3 is a flow chart depicting selected steps of a method of producing an asphalt additive in accordance with aspects of the present invention;

FIG. 4 is a flow chart depicting selected steps of a method of producing an asphalt mixture in accordance with aspects of the present invention;

Figure 1:
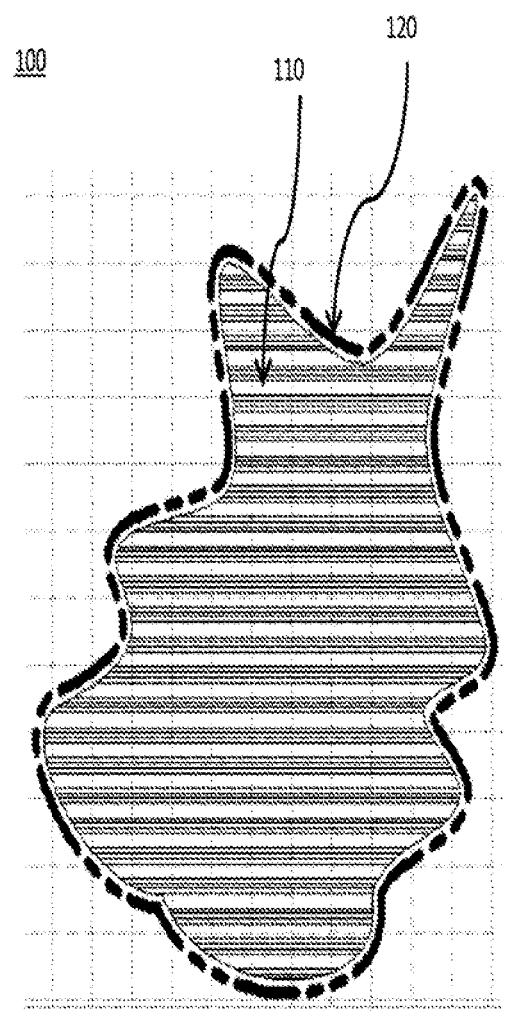
FIG. 1 is a schematic representation of a substrate particle coated in accordance with aspects of the present invention.

The foregoing summary, as well as the following detailed description of certain embodiments of the present invention, will be better understood when read in conjunction with the appended drawings. For the purposes of illustration, certain embodiments are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION OF THE INVENTION

The present technology deals with an asphalt additive that can be combined with aggregate and hot asphalt binder.

As used herein, "substrate particle" includes any particulate matter which, when contacted with an elastomeric emulsion, causes the emulsion to "break" into water and solid elastomer particles, and which is able to be coated with the resulting solid elastomer particles. The substrate particle preferably has a nominal diameter ranging from 50 microns to 600 microns (−140 mesh to −16 mesh sieve sizes). The inventor has observed that when crumb rubber particles are contacted with an emulsion of styrene butadiene styrene, the styrene butadiene styrene will separate out from the emulsion and begin nucleating about the crumb rubber particles to form a solid elastomer coating. One of ordinary skill in the art will understand that "substrate particle" includes polymer and mineral particles other than crumb rubber such as, e.g., sand, polyethylene, polypropylene, EPDM, etc.

As used herein, "coating" does not require that the substrate particle be entirely coated with one or more coating layers. Rather, one of ordinary skill in the art will understand that the benefits of the instant invention can be achieved where the coating layer does not fully envelop the plurality of substrate particles. That is, as will be understood by one of ordinary skill upon reading this disclosure, a coating layer which only partially coats the plurality of substrate particles will be sufficient to achieve the enhanced fatigue, rutting, thermal cracking, moisture damage, and frictional properties of asphalt mixtures incorporating the inventive asphalt additives. Acceptable coating may be achieved where the coating encapsulates, on average, between 1% to 100% of the surface area of the plurality of substrate particles, more preferably at least 5%, 10%, or 20%, or at most 95%, 90%, or 80%, or between 40 to 100%, and most preferably between 60 to 100%. In sum, the range of coating coverage may be between any of the lower limits listed above to any of the upper limits listed above, such as from 1 to 100%, 1 to 95%, 1 to 90%, 1 to 80%, 5 to 100%, 5 to 95%, 5 to 90%, 5 to 80%, 10 to 100%, 10 to 95%, 10 to 90%, 10 to 80%, 20 to 100%, 20 to 95%, 20 to 90%, 20 to 80%, 40 to 100%, 40 to 95%, 40 to 90%, 40 to 80%, 60 to 100%, 60 to 95%, 60 to 90%, or 60 to 80%.

As used herein, "aggregate" refers to a graded combination of mineral aggregates commonly used in asphalt mixture design process. The type, particle size, and particle size distribution of mineral aggregates would be well understood by one of ordinary skill in the art. For example, the types of aggregate may include Limestone, Dolomite, Diabase, Granite, River Gravel, Trap Rock, Sandstone, etc. and the particle size distribution ranges from dense, open graded, porous, stone matrix, slurry seal, chip seal, micro surfacing, etc. The average particle size of the mineral particles typically vary over a wide range, such as from about 37.5 min to about 0.05 mm. In some embodiments, the particle size is defined by those particles which pass through a #200 sieve (i.e., are "minus #200 or less than about 0.075 mm). As used herein, "asphalt mixture" or "asphalt mix" refers to a mixture produced by adding hot asphalt binder or cold asphalt binder emulsion to the graded aggregate. Asphalt mixture may be produced Hot (320° F.), Warm (270° F.), or Cold depending upon the temperature of the graded aggregate.

As used herein, "wet mix methods" of adding rubber to asphalt involve adding the rubber to the binder, cooking the blend and then selling it as a modified rubber binder. The rubber has to be cooked into the binder for an hour or more at high temperatures before use. Either at an asphalt supply terminal or a larger asphalt production facility, the blending and cooking process requires a separate processing, pumping and storage tank. If the modified asphalt is stored for any length of time, it has to be agitated in order to keep the crumb rubber properly diffused in the mix. A failure to properly diffuse the rubber will produce highly variable and defective modified binders. When the modified rubber binder is delivered to the asphalt production facility for use in hot mix asphalt production, the modified rubber binder requires a dedicated storage tank. When a project requires the use of a modified rubber binder, it is common to have a partial load of modified rubber binder that is typically used to produce asphalt that is left over or was unnecessarily modified.

As used herein, "dry mix methods" involve (instead of adding the rubber to the binder, cooking the mix and then selling it as a modified rubber binder as done in a wet mix process) adding modified rubber directly into the process as part of the mineral aggregate at the drum mix or batch mix plant (the plant where gravel, sand and binder are mixed together in order to produce the asphalt mix used to pave roads) where hot mix is being manufactured. This method produces a rubber modified asphalt composite that can be readily compacted properly in the field and requires no special laydown equipment or procedures. Because the process eliminates expensive equipment, special handling procedures, middlemen and waste, it is substantially cheaper and easier than either wet process rubber or polymer modification of asphalt binders and their inclusion into asphalt mixes.

The dry method of producing crumb rubber modified asphalt mix has been used in the state of Georgia for the past decade. The State DOT in GA has a special provision in their specifications to allow the use of the dry mix process with a caveat that such a mix must contain 4.5% phr (4.5% of the amount of rubber added) of polyoctanemar industrial wax also known as TOR or by its trade name Vestenemer. It is believed that addition of TOR facilitates the use of dry mix produced asphalt mix with improvement in mix workability.

The disadvantage of using the crumb rubber and TOR mixture is that other than modifying the stickiness and workability of the asphalt mixture, it does not pass the MSCR and m-value requirements typically imposed by the State DOTS. It is also difficult to control the correct content of the TOR once it is mixed with the crumb rubber particles.

In one embodiment, a composition is provided. The composition includes a plurality of substrate particles and a coating layer disposed on the particles. The composition may be used as an asphalt additive in both the dry mix or the wet asphalt binder methods of producing modified asphalt mixtures. The present method improves the workability and reduces stickiness to the construction and paving apparatus. In addition, the composition may also satisfy the MSCR and m-value requirements specified by state highway agencies (DOTs). For example, these standards may be met when the plurality of substrate particles are crumb rubber particles. In one embodiment, the crumb rubber particles are recycled crumb rubber particles.

FIG. 1 depicts a coated substrate particle 100 which is formed of a single substrate particle 110 and a coating layer 120. While coating layer 120 could fully encapsulate substrate particle 110, coating layer 120 is depicted as partially encapsulating substrate particle 110 such that substrate particle forms the "core" of coated substrate particle 100.

The inventive composition for use in such a dry mix process is produced by coating at least a portion of the surface of the substrate particle 110 with a polymer (such as an elastomer) and a polymer crosslinking agent. Without intending to be bound by a particular theory, this coating, which directly contacts the underlying substrate particle 110, is believed to produce an interface layer which serves as an efficient stress transfer mechanism between the asphalt binder and coated substrate particle 100 containing the coating layer 120 acting as an interface. This interface layer also serves as a crack pinning mechanism by transferring tensile stresses induced by advancing asphalt binder crack fronts to the rubber particle thereby consuming crack energy that would otherwise be used by the binder to further advance the crack. An example of such a mechanism can be the reinforcement bars used in cement concrete to transfer tensile stresses from cement concrete matrix to the steel reinforcement bars.

In another embodiment, the inventive composition is a plurality of substrate particles having a solid elastomer adhered to the particles. In this regard, the solid elastomer need not be thought of as a "coating" or "layer" but, rather, as substrate particles having solid elastomer adhered to discontinuous portions of the surfaces of the substrate particles.

In another embodiment, the inventive composition may also be for use in asphalt binder modification 'wet method' process is produced by coating at least a portion of the surface of the rubber with a polymer and a polymer cross-linking agent.

The inventive asphalt additive for use in such a dry mix process and the 'wet method' is produced by coating at least a portion of the surface of the rubber with a polymer and a polymer crosslinking agent. The interface layer produced by the coating, because of the cross-links, also serves as a mopping mechanism whereby it allows the asphalt mix to not adhere to the construction equipment such as truck beds, compactors, and rollers.

It is desirable to add rubber to an asphalt binder because it will increase rutting resistance and reduce cracking of the final asphalt product. Part of the reason for that improvement is that higher levels of rubber addition require the addition of modified binder. Modified binder will help with rutting resistance, especially if the binder is a 76-22. Another reason that cracking is reduced by rubber has to do with the process of crack attenuation. If a crack begins, rubber grains can serve as a sort of an energy dissipation mechanism, and as the crack reaches the rubber, the rubber tends to absorb some of the energy associated with crack formation, thus slowing or stopping the cracking process altogether. Rubber amounts equal to or greater than 1 lb. of rubber per 10 lbs. of binder perform as effectively as polymer modification of binders.

The rubber can be from a variety of rubber sources such as rubber ground through ambient means and rubber ground through cryogenic means. In one embodiment, the rubber is a crumb rubber such as one that is made from auto tires and/or truck tires. The size of the substrate particles may vary over a wide range, such as particles between minus #16 (those particles passing through a #16 sieve, less than 4.75 mm) and minus 60 (those particles passing through a #60 sieve, less than 0.038 mm). For example, in one embodiment, the rubber particles are those particles having a size of minus #30 ASTM Sieve (less than 0.6 mm). In other embodiments, larger particles may be used, such as particles having an average particle size as high as 127 mm.

The coating layer on the plurality of substrate particles includes a solid elastomer. It is desirable to add an elastomer to an asphalt binder because the elastomer forms cross-links with the asphalt molecules which appear to have a powerful impact on the binder by reducing rutting and cracking. The elastomer forming the coating layer on the plurality of substrate particles can be any one of a number of elastomers known to one of ordinary skill in the art such as SBR, SB, SBS, TER polymer, liquid neutral, cationic or anionic rubber latex and other elastomers or mixtures thereof.

The cross linking agent encourages cross-linking of the elastomer in the asphalt. For example, if SBR is used as the elastomer, then the cross-linking agent serves to encourage at least some cross-linking of the strands of SBR in the asphalt. A cross-link is a covalent or ionic bond that links one polymer chain to another. "Polymer chains" can refer to synthetic polymers or natural polymers. When the term "cross-linking" is used with reference to synthetic polymer, it usually refers to the use of cross-links to promote a difference in the polymers' physical properties.

Although the term is used to refer to the "linking of polymer chains", the extent of crosslinking and specificities of the crosslinking agents may vary. When cross links are added to long rubber chains, the flexibility decreases, the stiffness and melting point increases. The cross-linking agent can be elemental sulfur, peroxide compounds, and other sulfur donating cross-linking agents, Zinc Oxide, or their mixtures. In one embodiment, the cross-linking agent is a disulphide. Cross-links can be formed by chemical reactions that are initiated by heat, pressure, change in pH, or radiation. For example, mixing of an unpolymerized or partially polymerized resin with specific chemicals called crosslinking reagents results in a chemical reaction that forms cross-links. Cross-linking can also be induced in materials that are normally thermoplastic through exposure to a radiation source, such as electron beam exposure, gamma-radiation, or UV light. For example, electron beam processing is used to cross-link the C type of cross-linked polyethylene. Other types of cross-linked polyethylene are made by addition of peroxide during extruding (type A) or by addition of a cross-linking agent (e.g. vinylsilane) and a catalyst.

The chemical process of vulcanization is a type of cross-linking that changes rubber to the hard, durable material associated with car and bicycle tires. This process is called sulfur curing or vulcanization. This is a slow process. A typical car tire is cured for 15 minutes at 150° C. The curing time may be reduced by the addition of accelerators such as 2-benzothiazolethiol or tetramethylthiuram disulfide. Both of these contain a sulfur atom in the molecule that initiates the reaction of the sulfur chains with the rubber. Accelerators increase the rate of cure by catalysing the addition of sulfur chains to the rubber molecules. Cross-links are the characteristic property of thermosetting plastic materials. In most cases, cross-linking is irreversible, and the resulting thermosetting material will degrade or burn if heated, without melting.

One of ordinary skill in the art will understand that the proportions of the Engineered Crumb Rubber according to the invention (ECR) used may vary depending on the binder one wishes to modify (lower amount of ECR is added for a smaller binder adjustment). In a typical refinery that produces asphalt anywhere in the world, the mix of crude oils (called crude slate) changes based on market price and availability of various crudes. This change in crude slate produces asphalt binders that require more or less ECR to formulate the same binder grade for sale. This variation in asphalt binder quality also affects asphalt suppliers who prefer to keep the asphalt grade the same from day to day. For example, an asphalt supplier may purchase a PG 64-22 from a refinery to formulate a PG 76-22 by adding ECR. If the refinery keeps supplying asphalt binder of PG 64-22 grade as well as the same chemical makeup then the asphalt supplier can use a fix predetermined formulation to successfully produce the same PG 76-22 grade every day. If, however, the refiner decides to change the crude slate and supplies the same grade asphalt, but of a different chemical nature, then the asphalt supplier has to re-formulate the amount of ECR being added to produce the same PG 76-22 grade for his day to day supply.

The substrate particles and additional chemicals may be blended. This can be done, for example, in a large scale paddle mixer. The addition of the elastomer and cross-linking agent for mixing with the substrate particles can occur simultaneously or individually.

The elastomer can be added as an emulsion at variable rates. For example, the elastomer can be added at rates centered around 0.1 lbs. per pound of substrate particles, e.g., crumb rubber, addition to the mix. The cross-linking agent can similarly be added at variable rates. For example, the cross-linking agent can be added a target rate of 0.01 lbs. per pound of substrate particles, e.g., crumb rubber, addition to the mix.

The weight percentages of the various constituents can vary over a wide range. In accordance with a preferred embodiment of the invention, the composition comprises about 90 to 10 wt. % substrate particles (all wt % are based on the weight of the total composition unless otherwise noted) and about 10 to 90 wt % coating layer. More preferably, the composition comprises about 85 to 70 wt. % substrate particles and about 15 to 30 wt % coating layer. If a cross-linking agent is added to the composition, it is preferably added in an amount of from about 1 to 0.02 wt %, more preferably from about 0.1 to 0.01 wt %. The specific content of the constituents of the emulsion can vary over a wide range but are preferably from about 70 to 20 wt % solid elastomer and about 30 to 80 wt % continuous phase based on the total weight of the emulsion, more preferably about 66 to 40 wt % solid elastomer and about 34 to 60 wt continuous phase.

When the composition is used along with an aggregate and a binder, it may be added over a wide range, preferably in an amount of about 25 to 5 wt % based on the total weight of the binder, more preferably about 12 to 5 wt %, and most preferably from about 10 to 7 wt %. The amounts of the aggregate and binder may be the same as conventional asphalt mixes.

Figure 17:
FIG. 17 is a scanning electron microscope image of a composition in accordance with aspects of the present invention.

Preferably, the elastomer emulsion is added to the substrate particles before any shearing force is applied (e.g., mixing). In this manner, a sufficient coating of elastomer on the substrate particles occurs before the shearing force separates the solid elastomer from the continuous phase of the emulsion. As a result, a greater percentage of solid elastomer is adhered to the surface of the substrate particles. The elastomer emulsion may be added to the substrate particles while or after shearing force is applied. The adhered solid elastomer may be thought of as a coating layer surrounding the "core" substrate particle. However, and as described above, the solid elastomer need not fully encapsulate (e.g., fully coat) the substrate particle. As shown in FIG. 17, a scanning electron microscope image of a substrate particle is shown with discontinuous patches of solid elastomer adhered to the surface of the substrate particle.

The shearing force necessary to break the emulsion coated on the substrate particles may be obtained from any source known to one of ordinary skill in the art such as, e.g., hand-mixing, large scale paddle mixing, etc. The requisite shearing force can readily be determined empirically by identifying that shearing force necessary to break the emulsion.

Where the elastomer emulsion and cross-linking agent are added individually, the cross-linking agent is preferably added after the elastomer emulsion. The addition of the elastomer emulsion to the substrate particles causes the substrate particles to become tacky and facilitates the addition of the cross-linking agent.

The inventive composition can be shipped in bulk sacks to the end user. The end user can then pour the free flowing composition through the RAP collar in case of drum mix plants or as a part of mineral aggregate batching process in case of the batch mix plants.

In order to blend polymers and binders, both cooking time and shearing mixing are desirable. The industry model has been to perform this process under expensive, controlled conditions at an asphalt binder terminal. One important reason for that approach has been the realization that introduction of SBS polymer into a dry, hot environment will result in rapid melting and clumping of the polymer, which will lead to improper mixing and unstable binder performance. An embodiment of the present approach uses the elastomeric rubber as a wet emulsified polymer carrier in which the rubber micro sized particles do not melt as they are injected into the process at temperatures less than 300 to 320° F. The coating of micro gains of the elastomer interface however melt instantaneously once the hot asphalt binder (typically at 325 to 350° F.) is introduced to the mixture of hot mineral aggregates and ECR and creates an in-situ interface on the crumb rubber particle which is cross linked to the asphalt and to other similar coated crumb rubber particles. The rubber/binder/aggregate of the modified rubber asphalt additive works as a composite rather than a suspension of chemicals in a viscous liquid, and as a result, the shearing mixing in the asphalt plant guarantees a homogenous distribution of rubber, reagents and binder throughout the mass of hot mix asphalt.

Lab and field testing of rubber modified binders and mixes shows that both wet and dry processes appear to similarly enhance the binder and mix performance through the use of dry mix ECR rubber additions. Lab testing appears to demonstrate that the polymer and cross-linking agent additives do produce cross-linked asphalt that further modifies the asphalt satisfying the MSCR and m-value requirements.

In another embodiment, an asphalt mixture is provided. The asphalt mixture includes any of the inventive compositions described above, aggregate, and one or more asphalt binders.

In FIG. 2 a process 200 depicting selected steps of a method of producing a chip seal surface according to aspects of the invention is shown. It should be noted that, with respect to the methods described herein, it will be understood from the description herein that one or more steps may be omitted and/or performed out of the described sequence of the method (including simultaneously) while still achieving the desired result.

In step 210, any of the inventive asphalt additive compositions described above are mixed with an asphalt binder to form an asphalt composition. The mixing may be performed at aggregate feed belts, RAP collar, pug mill and/or other locations as will be understood by one of ordinary skill in the art.

In step 220, the asphalt composition is applied to a surface to form a sealed surface. The surface may be a highway, roadway, or other paved surface.

In step 230, a layer of aggregate is placed over the sealed surface. Upon contact, the aggregate causes the asphalt composition to set quickly. For example, the chip seal surface may then be cured for 5-10 hours. The chip seal surface should may then be swept to remove loose aggregate prior to opening the sealed roadway surface to traffic.

In FIG. 3, a process 300 depicting selected steps of a method of producing an asphalt additive according to aspects of the invention is shown.

In step 310, an emulsion including an elastomer is mixed with a plurality of substrate particles. Any of the elastomers described above may be used such as, e.g., styrene butadiene styrene (SBS). For example, a 36% solids content linear or radial SBS and 64% water as continuous phase as commercially available SBS emulsion from Shandong Dashan Road and Bridge Company located in Jinan China may be used for making ECR In a preferred embodiment, crumb rubber particles are used as the plurality of substrate particles.

In one embodiment of the inventive method, the mixing step includes a cross-linking agent. The cross-linking agent may be added directly to the emulsion, or it may be added after the emulsion is mixed with the elastomer.

As described above, it has been observed in some cases that the addition of the emulsion to the substrate particles "breaks" the emulsion, resulting in a separation of the solid elastomer and from the aqueous continuous phase.

In FIG. 4, a process 400 depicting selected steps of a method of producing an asphalt mixture according to aspects of the invention is shown.

In step 410, any of the inventive compositions described above are combined with aggregate and a suitable asphalt binder.

Other additional additives may be added during the combining step to form the resulting asphalt mixture. For example, in one embodiment, polyphosphoric acid, ranging from 85% to 115% on a $H_3PO_4$ basis, may be an additional additive for combination. In another embodiment, the additional additive may be asphaltenes (sold under the tradename Gilsonite® by American Gilsonite Company, Bonanza, Utah).

Figure 5:
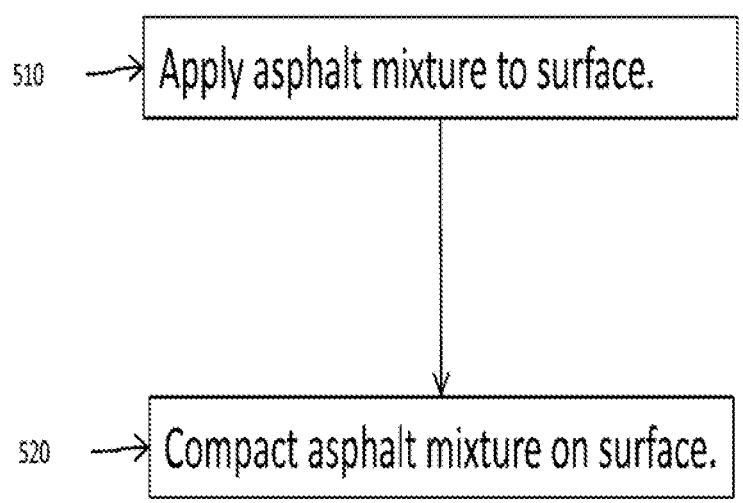
FIG. 5 is a flow chart depicting selected steps of a method of paving a surface in accordance with aspects of the present invention.

In FIG. 5, a process 500 depicting selected steps of a method of paving a surface according to aspects of the invention is shown.

In step 510, any of the inventive asphalt mixtures described above are applied to a surface such as a roadway, highway, or other paved surface. The application may be under "warm mix" or "hot mix" conditions. An asphalt paver may be used to receive and deposit the asphalt mixture to form a freshly laid asphalt pavement.

In step 520, the asphalt mixture is compacted on the surface. An asphalt paver may be used to perform a partial compaction of the asphalt mixture. After initial compaction by the asphalt paver, a compactor, such as, a roller or drum compactor, may be used for final compaction.

The inventive composition may, in some embodiments, be used in a crack sealant asphalt binder or a roofing asphalt binder. For example, a crack sealant asphalt may be produced by adding 25% to 40% of the present composition and 75% to 60% of asphalt binder and other additives such as fillers.

Figure 6:
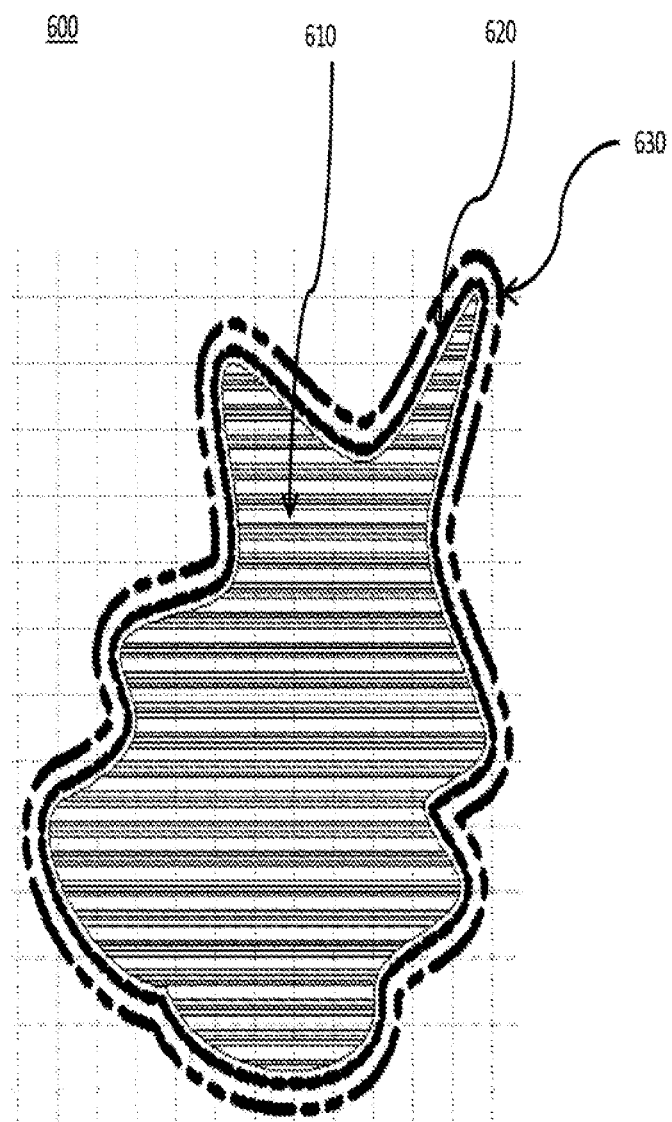
FIG. 6 is a schematic representation of a substrate particle coated in accordance with aspects of the present invention.

Turning to FIG. 6, a particle 600 of a composition according to aspects of the invention is shown.

Substrate particle 600 includes a first coating layer 620 disposed on an outer surface of the substrate particle 610 and a second coating 630 disposed on an outer surface of the first coating layer 620. In one embodiment, first coating layer 620 is a solid elastomer, and second coating layer 630 is an additional additive such as asphaltenes or polyphosphoric acid. One of ordinary skill in the art will understand that these layers can be interchanged without departing from the concepts of the invention described herein. That is first coating layer 620 may be asphaltenes or polyphosphoric acid, and second coating layer 630 may be a solid elastomer.

Figure 7:
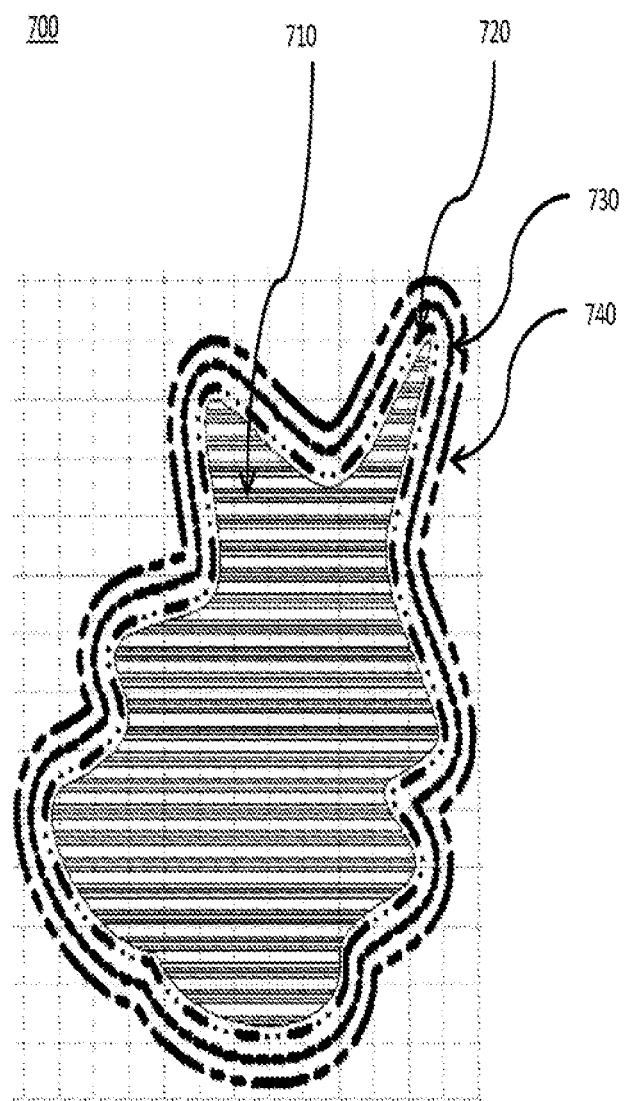
FIG. 7 is a schematic representation of a substrate particle coated in accordance with aspects of the present invention.

FIG. 7 depicts a particle 700 of a composition according to aspects of the present invention. Substrate particle 710 includes a first coating layer 720 disposed on an outer surface of the substrate particle 710 and a second coating 730 disposed on an outer surface of the first coating layer 720. A third coating layer 740 is disposed on an outer surface of the second coating layer 730. In one embodiment, third coating layer 740 is a solid elastomer, and second coating layer 730 and first coating layer 720 are, respectively, polyphosphoric acid and asphaltenes. As noted above, one of ordinary skill in the art will understand that these layers can be interchanged without departing from the concepts of the invention described herein.

In another embodiment, the inventive composition may be used in a high modulus asphalt mixture. High modulus asphalt mixes are produced with asphalt binder that is modified using higher than normal amounts of polymer (usually SBS in the range of 7 to 10%). Whereas, 3 to 3.5% SBS is normally used to modify asphalt binders. High modulus mixtures are used in value engineering designs where layer thickness of asphalt layers are reduced thus saving money. High modulus mixtures are expensive and difficult to produce. The cost of higher than normal amounts of polymer make the high modulus mixes expensive. Whereas the high viscosity of highly modified asphalt binders require more complicated pumping equipment, the use of engineered crumb rubber of invention described here (8 to 15%) along with normal polymer modified asphalt (2 to 3% SBS or other elastomers) can be used to produce high modulus mixes. The Dry Method of making mixes allows making high modulus mixes cheaply by substituting less expensive crumb rubber described here for more expensive polymer. It also eliminates the problem of high viscosity binder because the binder remains normally polymer modified binder with only 2 to 3% elastomer added.

EXAMPLES

The following examples are included to demonstrate the overall nature of the present invention.

Example 1

Figure 8:
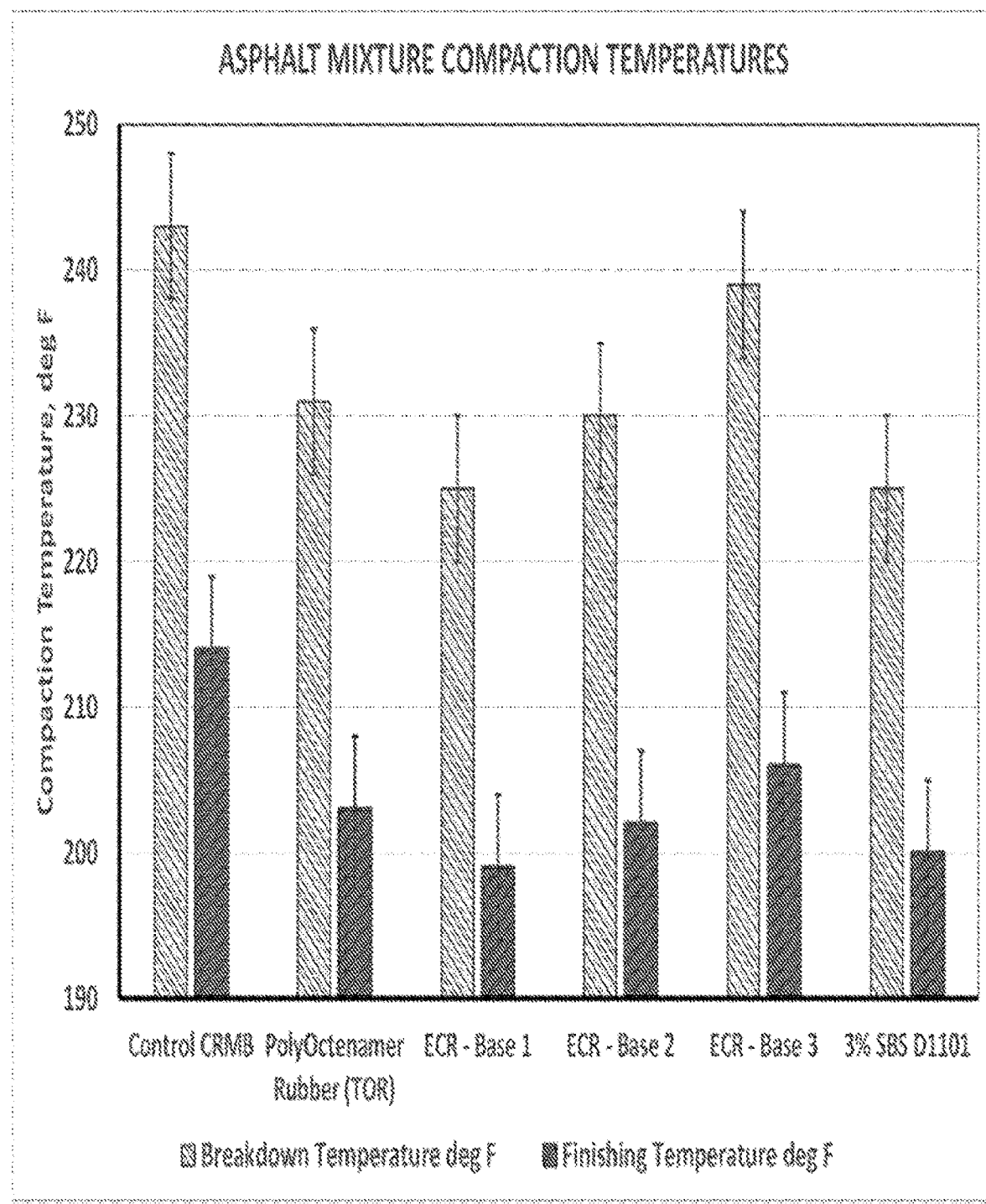
FIG. 8 is a graph showing compaction temperature results for compositions in accordance with aspects of the present invention.

FIG. 8 is a graph showing asphalt mixture compaction temperature results for compositions of the present invention.

In this experiment The Dongre Workability Test AAPT 2014 (Dongre, Raj, Morari Eugeniu, and Pyle Roger, "Development of a Simple Test to Determine Workability and Field Compaction Temperatures of Asphalt Concrete", Journal of The Association of Asphalt Paving Technologists (AAPT), Vol. 83, 2014, Atlanta.) was conducted to determine the breakdown and finishing compaction temperatures for the coated crumb rubber and other wet and dry additives.

The Engineered Crumb Rubber ("ECR") as set forth in these examples was made by treating crumb rubber with a 67% SBR emulsion sold by BASF under the trade name NS1129. 14.9 grams of emulsion were added drop-wise (to reduce premature agglomeration of the SBR) to a 100 g batch of untreated crumb rubber. The emulsion was added to the crumb rubber in a way which caused the emulsion to come into contact with the crumb rubber particles before the emulsion was exposed to a mixing force causing the emulsion to break. Hand mixing resulted in a separation of the solid SBR from the continuous phase of the emulsion. The remaining continuous phase (water) was driven off during the mixing. After mixing, solid SBR was adhered to the surface of the crumb rubber particles, causing the crumb rubber particles to become tacky/sticky. Next, 0.2 g of powdered elemental sulfur (a rate of 0.2% per weight of the crumb rubber particles) was added as a cross linking agent. The slightly tacky nature of the combined crumb rubber/SBR facilitated adherence of the elemental sulfur to the surface of the particles. Each of the above described steps were carried out at room temperature.

The six compositions in FIG. 8 were made as follows: 1) Control CRMB—10% of minus #30 mesh untreated crumb rubber by weight of base asphalt binder (PG 64-22) was blended for 45 minutes at 163° C. (325.4° F.) using a low shear blender. The blended crumb rubber asphalt binder was then added (5.1% asphalt binder content) to hot aggregate (163° C. or 325.4° F.) and mixed in a laboratory bucket mixer until the aggregate is thoroughly coated (approximately 2 to 3 minutes). The loose mix was then tested according to the protocols of the Dongre Workability Test Method; 2) Polyoctanemar rubber (TOR)—Untreated minus #30 mesh crumb rubber was mixed with Polyoctanamer pellets at 4.5% phr at room temperature. This dry mixture was added at 10% by weight of the asphalt binder to dry heated aggregate (163° C. or 325° F.). PG 64-22 base asphalt binder heated to 163° C. (325.4° F.) was then added at 5.1% asphalt binder content to the hot aggregate mixed with crumb rubber Polyoctanamer mixture and blended in a bucket mixer until thoroughly coated (approximately 2 to 3 minutes). The loose mix was then tested according to the protocols of the Dongre Workability Test Method; 3) ECR—Base 1—Engineered Crumb Rubber (ECR) was made as described above (−30 mesh) and was added at 10% by weight of the asphalt binder to dry heated aggregate (163° C. or 325° F.). PG 64-22 base asphalt binder heated to 163° C. (325.4° F.) was then added at 5.1% asphalt binder content to the hot aggregate mixed with ECR and blended in a bucket mixer until thoroughly coated (approximately 2 to 3 minutes). The loose mix was then tested according to the protocols of the Dongre Workability Test Method; 4) ECR—Base 2—Engineered Crumb Rubber (ECR) was made as described above (minus #30 mesh) and was added at 10% by weight of the asphalt binder to dry heated aggregate (163° C. or 325° F.). PG 67-22 base asphalt binder from source #1 heated to 163° C. (325.4° F.) was then added at 5.1% asphalt binder content to the hot aggregate mixed with ECR and blended in a bucket mixer until thoroughly coated (approximately 2 to 3 minutes). The loose mix was then tested according to the protocols of the Dongre Workability Test Method; 5) ECR—Base 3—Engineered Crumb Rubber (ECR) was made as described above (−30 mesh) and was added at 10% by weight of the asphalt binder to dry heated aggregate (163° C. or 325° F.). PG 67-22 base asphalt binder from source #2 heated to 163° C. (325.4° F.) was then added at 5.1% asphalt binder content to the hot aggregate mixed with ECR and blended in a bucket mixer until thoroughly coated (approximately 2 to 3 minutes). The loose mix was then tested according to the protocols of the Dongre Workability Test Method; 6) 3% SBS D1101—3% of Styrene Butadiene Styrene (SBS) polymer obtained from Kraton Polymers (product number D1101) by weight of base asphalt binder (PG 64-22) was blended for 2 hours at 163° C. (325.4° F.) using a Silverson L4R high shear blender. 0.02% phr sulfur was added after 2 hours and blended for additional 30 minutes at the same temperature to crosslink the SBS modified asphalt binder. The blended and crosslinked SBS modified asphalt binder was then added (5.1% asphalt binder content) to hot aggregate (163° C. or 325.4° F.) and mixed in a laboratory bucket mixer until the aggregate is thoroughly coated (approximately 2 to 3 minutes). The loose mix was then tested according to the protocols of the Dongre Workability Test Method.

FIG. 8 shows the breakdown roller temperature and the finishing roller temperature for the coated crumb rubber additive (ECR) and other relevant materials for comparison. This indicates that the present wet and dry coated crumb rubber additive (ECR) out performs both the control wet crumb rubber mix and is equal to the traditional SBS modified asphalt mix. It was also observed that the ECR modified dry mix was easier to handle as it was less sticky than untreated CRMB wet process mix to the handling equipment. This was an unexpected result and maybe explained by the presence of the SBR and other interfacial coating on the ECR dry mix which has a mopping effect whereby it pulls itself off from the handling equipment.

Example 2

Figure 9:
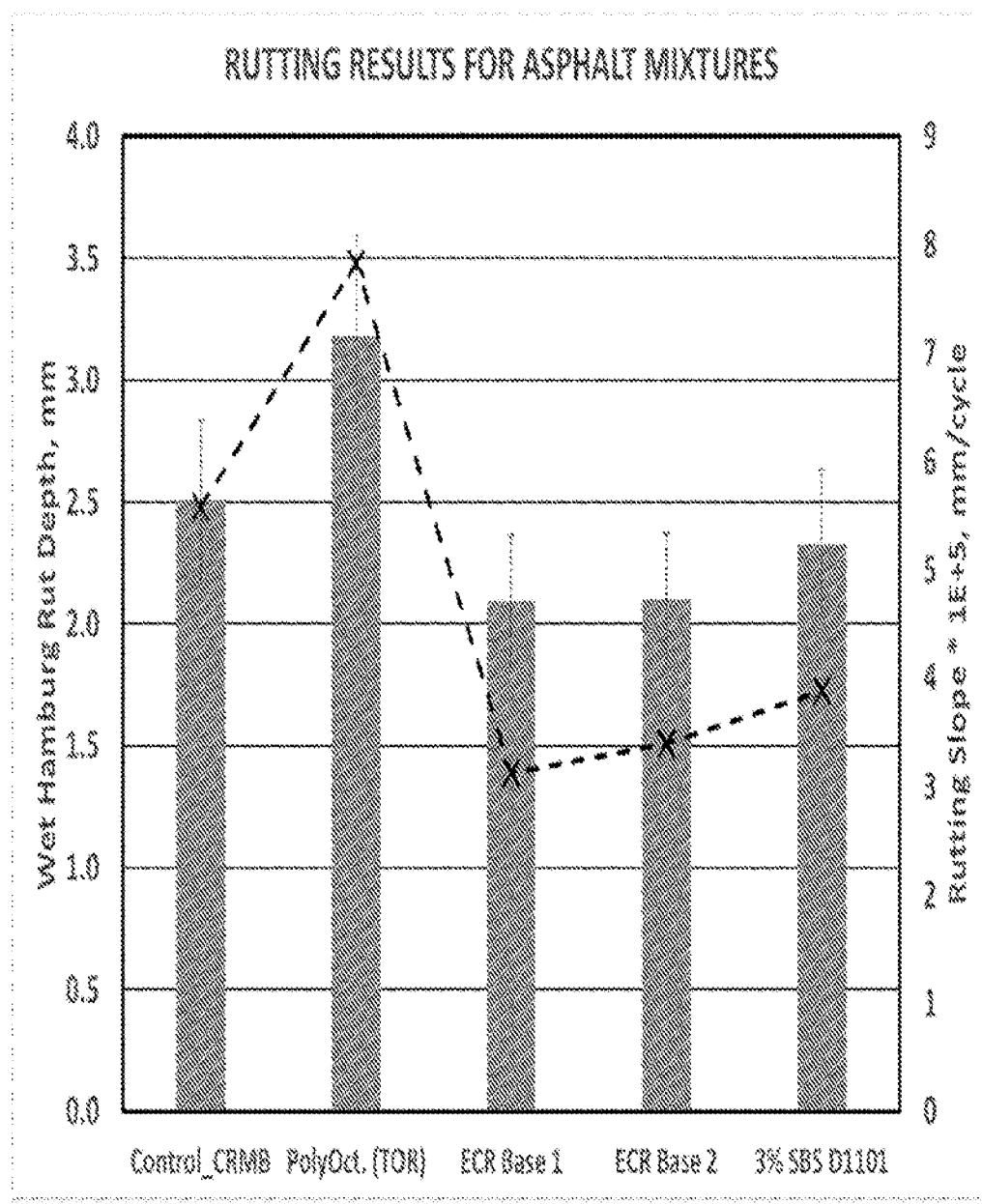
FIG. 9 is a graph showing wet Hamburg Rolling Wheel rutting depth for various compositions in accordance with aspects of the present invention.

FIG. 9 is a graph showing rutting depth for various modified asphalts using compositions of the present invention.

In this experiment the Hamburg Rolling Wheel Tester was used to determine rutting and moisture damage resistance of the crumb rubber coated additives and other relevant materials.

The five compositions in FIG. 9 were made as described in Example 1 above.

FIG. 9 shows the rut depths as a function of number of wheel passes. This indicates that there is no significant difference between the various traditional materials such as SBS modified asphalt Mix, wet CRMB asphalt mix, and ECR dry mix process.

Example 3

Figure 10:
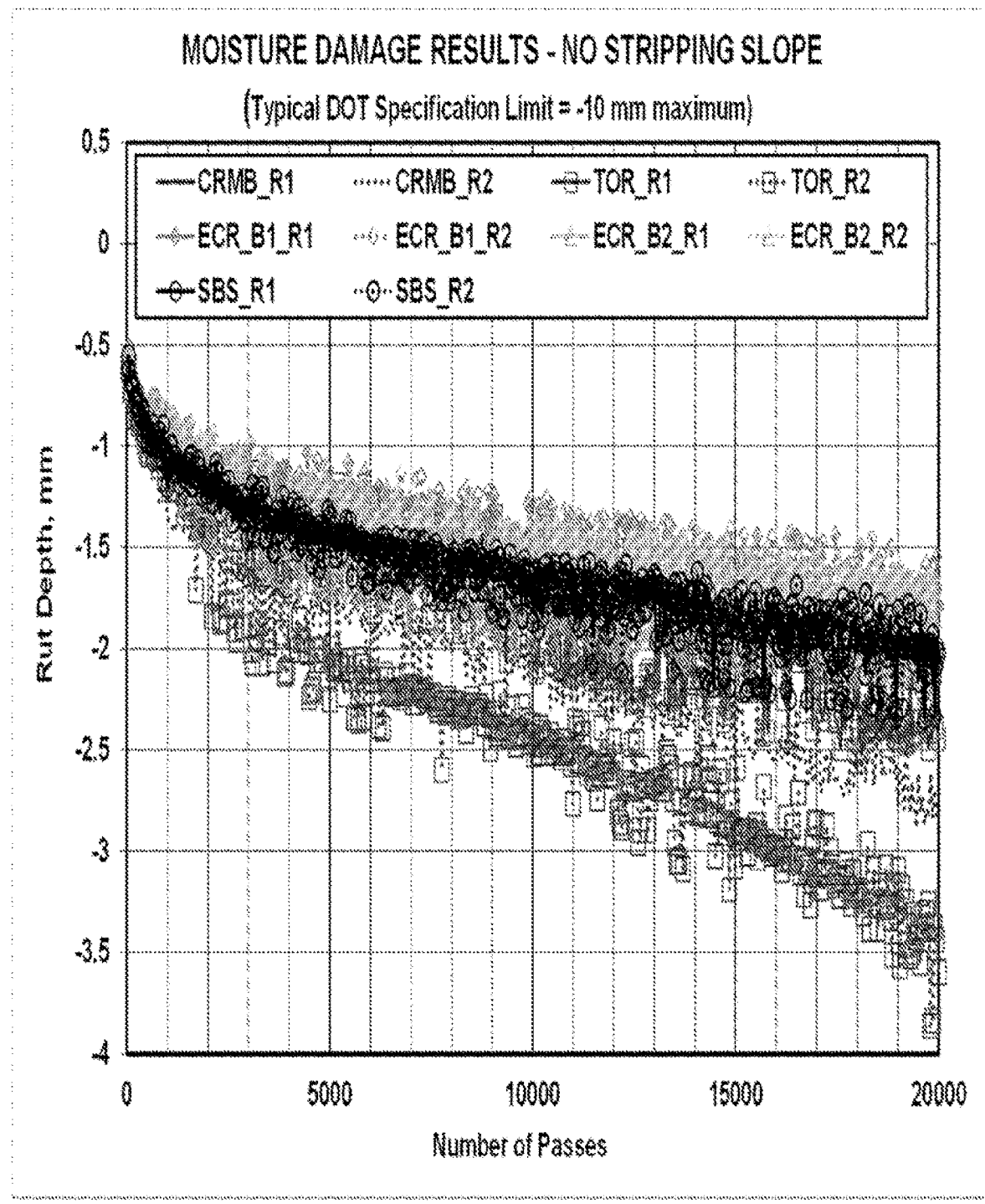
FIG. 10 is a graph showing wet Hamburg Rolling Wheel rutting depth vs number of cycles for compositions in accordance with aspects of the present invention.

FIG. 10 is a graph showing wet Hamburg Rolling Wheel Test rutting depth for various modified asphalts using compositions of the present invention.

In this experiment the Hamburg Rolling Wheel Tester was used to determine rutting and moisture damage resistance of the crumb rubber coated additives and other relevant materials.

The five compositions in FIG. 10 were made as described in Example 1 above. The suffix R1 and R2 are used to represent Replicate number 1 as R1 and Replicate number 2 as R2. FIG. 10 shows the rut depths as a function of number of rolling wheel passes. The curves do not show an inflection point which is considered as a beginning point for moisture damage. This indicates that there is no significant difference in moisture damage resistance between the various traditional materials such as SBS modified asphalt Mix, wet CRMB asphalt mix, and crumb rubber coated dry mix process.

Example 4

Figure 11:
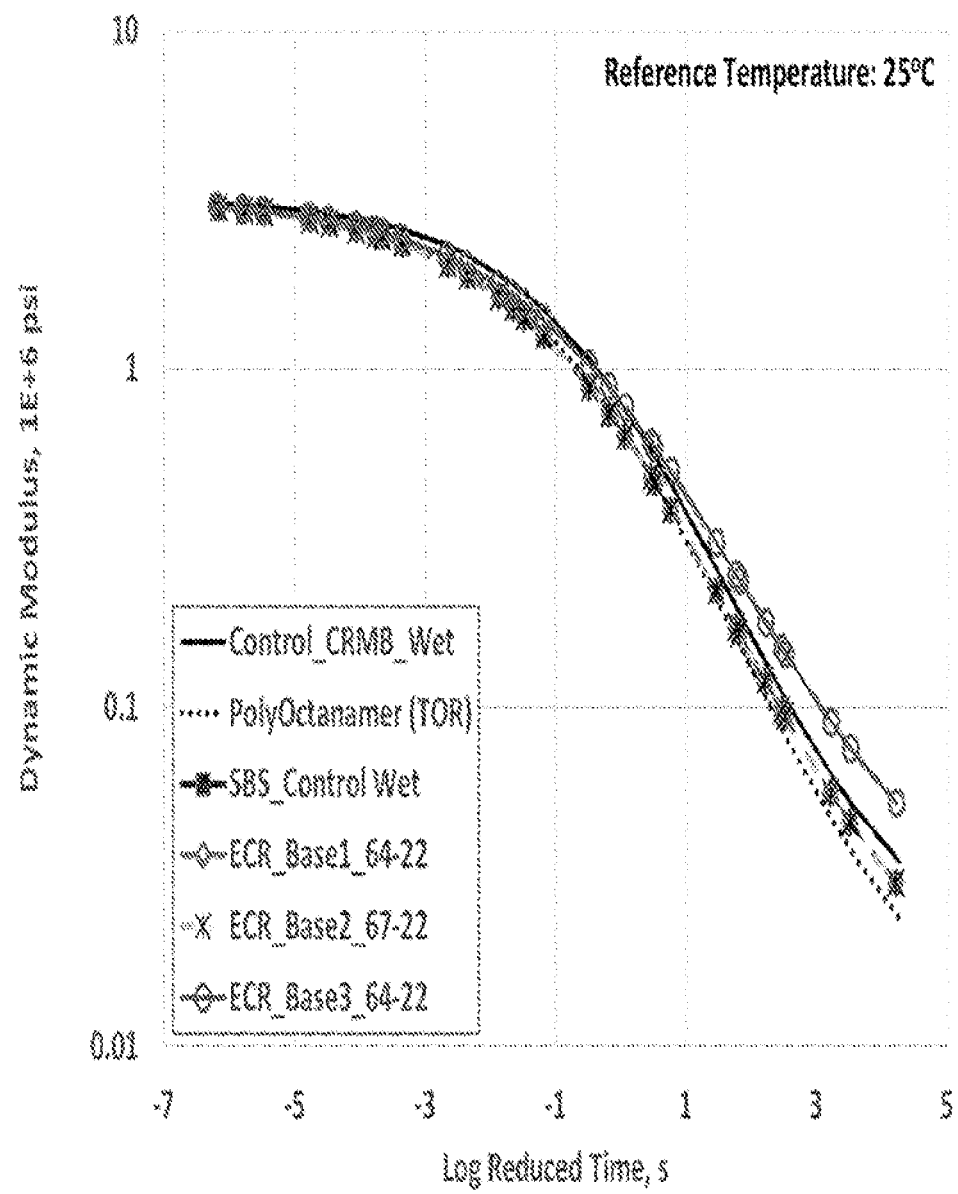
FIG. 11 is a master curve showing dynamic modulus results of compositions in accordance with aspects of the present invention.

FIG. 11 is a master curve showing dynamic modulus results for compositions of the present invention. The first control sample is a commercially available untreated crumb rubber modified asphalt graded as a PG 76-22 and the third control sample is also a commercially available SBS modified asphalt also graded as a PG 76-22.

In this experiment, the dynamic modulus E* of various asphalt mixes including the coated crumb rubber dry process mix was determined using the AMPT test (American Association of State Highway and Transportation Officials Asphalt Mix Performance Test Standard Test method AASHTO TP79-13).

FIG. 11 shows dynamic modulus plotted as a function of reduced loading time at a reference temperature of 25° C. (77° F.). This indicates that the differences in the dynamic modulus master curves between the control wet method crumb rubber asphalt mix, SBS modified asphalt mix, and the new crumb rubber coated mix are insignificant.

Example 5

Figure 12:
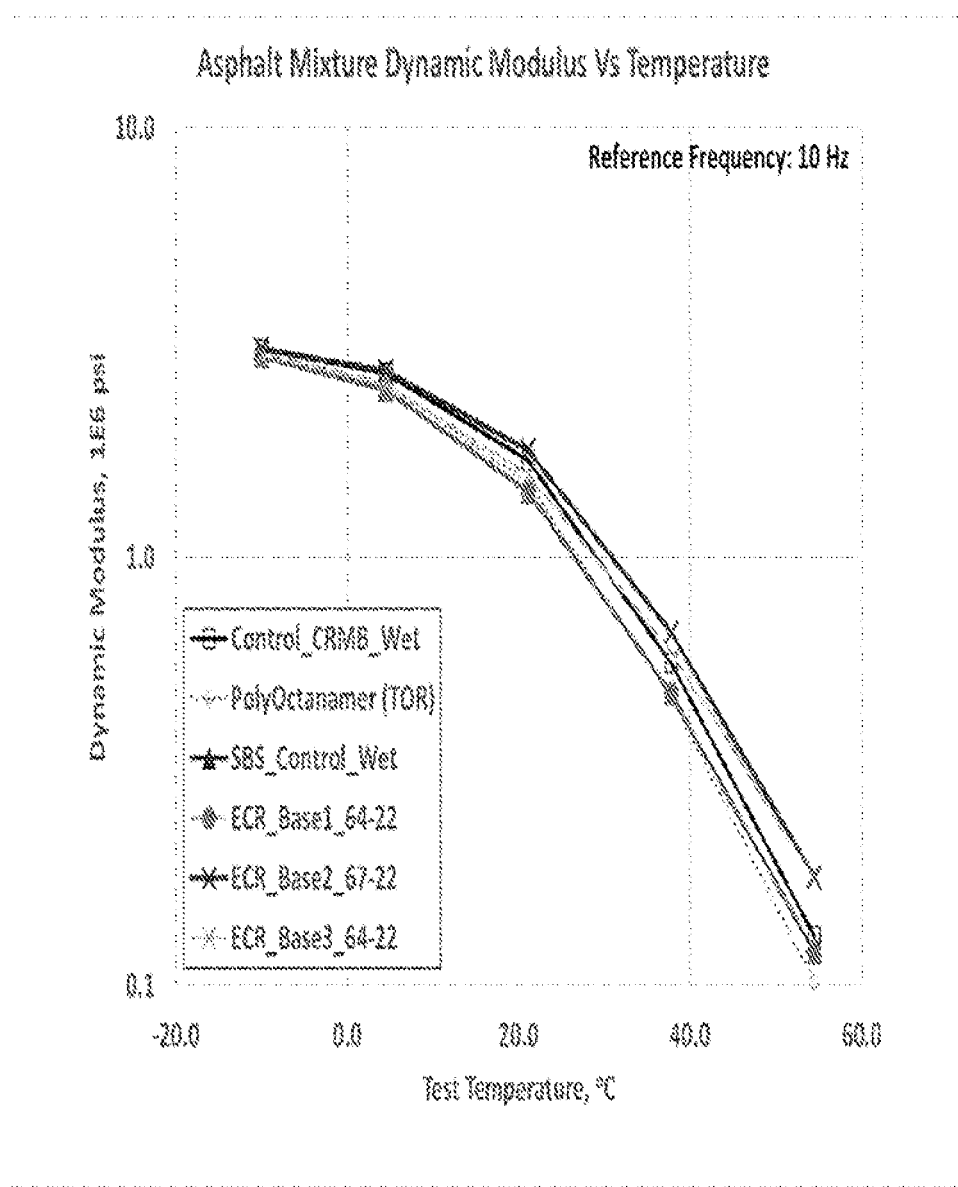
FIG. 12 is a dynamic modulus vs. temperature results of compositions in accordance with aspects of the present invention.

FIG. 12 is a dynamic modulus vs. temperature graph for compositions of the present invention. The first control sample is a commercially available untreated crumb rubber modified asphalt graded as a PG 76-22 and the third control sample is also a commercially available SBS modified asphalt also graded as a PG 76-22. In this experiment, the dynamic modulus E* of various asphalt mixes including the coated crumb rubber dry process mix was determined using the AMPT test (AASHTO TP79-13).

FIG. 12 shows dynamic modulus plotted as a function of reduced loading time at a testing frequency of 10 Hz. This indicates that the differences in the dynamic modulus master curves between the control wet method crumb rubber asphalt mix, SBS modified asphalt mix, and the new crumb rubber coated mix are insignificant.

Example 6

Figure 13:
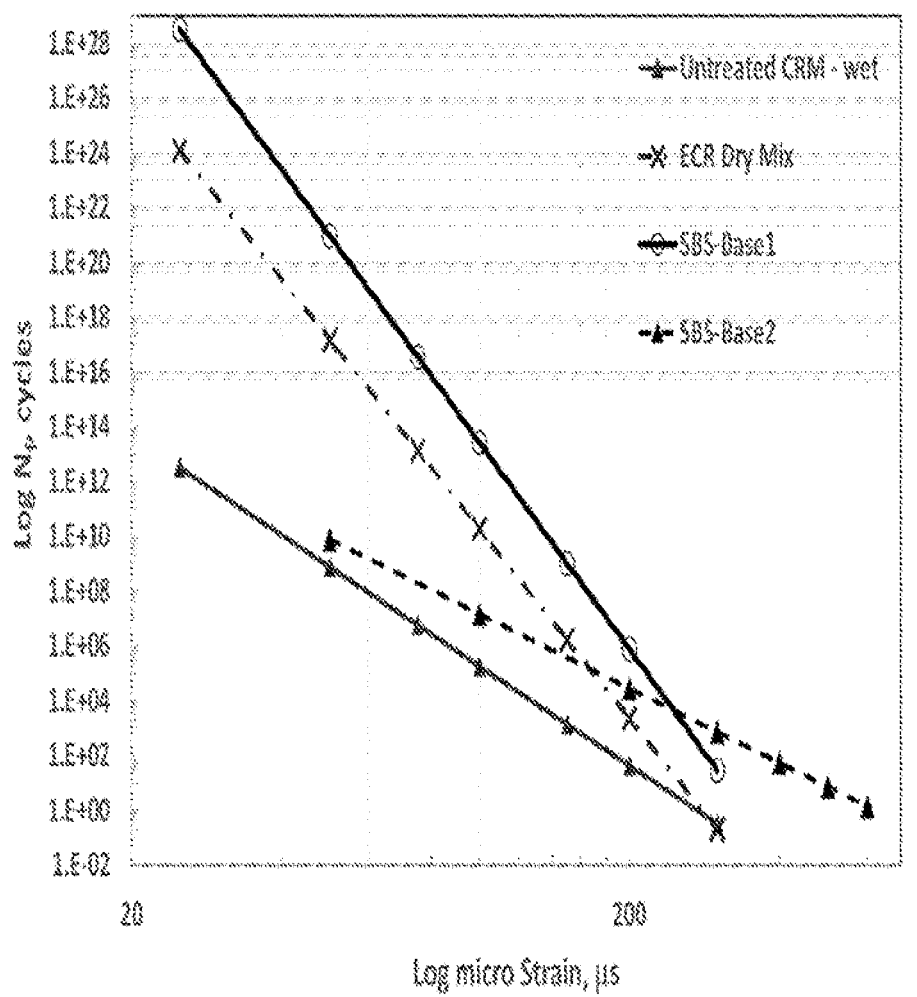
FIG. 13 is a plot showing mix fatigue analysis for a variety of compositions in accordance with aspects of the present invention.

FIG. 13 is a plant mix fatigue analysis for compositions of the present invention.

In this experiment fatigue tests were performed using the 2014 version of the S-VECD fatigue pull-pull testing protocol as proposed of NC State University by Dr. Kim (Underwood, B. S., Baek, C., & Kim, Y. R. (2012). "Simplified viscoelastic continuum damage model as platform for asphalt concrete fatigue analysis.", Transportation Research Record, Transportation Research Board, Washington, D.C., (Vol. 2296), pp. 36-45.).

FIG. 13 shows cycles to failure as a function of strain level at a temperature of 20° C. at 10 Hz. This indicates that the coated crumb rubber dry process mix as described here is equal or better than the traditional wet untreated crumb rubber and SBS modified mix.

Example 7

In this experiment, PG grade tests as per AASHTO M320, T350, and M322 (American Association of State Highway Transportation Officials Asphalt Binder Specification M320, MSCR Test Standard T350, and asphalt binder specification M322) were performed on a PG 67-22 grade base binder from source number 1 and the base modified using traditional SBS wet process and the coated crumb rubber dry process described herein, made in a manner as described in Example 1. MSCR tests were also performed to determine Jnr and percent recovery values at 64° C.

TABLE 1

| PG 67-22 Base Binder - Source #1 | | | | |
|---|---|---|---|---|
| | Base 1 | Control CRMB | ECR | SBS D1101 |
| Blend ID | B10 | B 11 | B 1E | A63 |
| % Rubber | 0 | 10 | 9.0 | 3 |
| Rubber Type | 0 | -#30 CRM | ECR | SBS D1101 |
| PG Grade | PG 67-22 | PG 76-22 | PG 82-22 | PG 76-22 |
| True Grade | 68.69-25.41 | 79.99-22.12 | 82.71-22.64 | PG 77.9-23.2 |
| Phase Angle @ 76° C. | 88.1 | 84.7 | 79.6 | 77.1 |
| m-value (−12° C.) | 0.336 | 0.301 | 0.305 | 0.307 |
| MSCR % Recov at 3.2 kPa (64° C.) | 1.5 | 27.3 | 41.2 | 41.1 |
| MSCR Jnr at 3.2 kPa (64° C.) | 2.1 | 0.3 | 0.2 | 0.5 |

The data in Table 1 shows that the modified binder produced using the dry process (blended for 45 minutes at 163° C. at low shear using paddle mixer) performed well. This table indicates that the modified binder with the coated crumb rubber ECR described here is equal or better (phase angle, both m-value and MSCR % recovery, and PG grade) than the traditional Control CRMB and similar to the SBS modified binder at 3% level. The m-value for the present dry mix coated crumb rubber additive ECR is equal or greater than the wet method control binder CRMB and similar to the traditional SBS modified asphalt binder (high shear mixing at 188° C. for 3 h).

Example 8

In this experiment, PG grade tests as per AASHTO M320, T350, and M322 (American Association of State Highway Transportation Officials Asphalt Binder Specification M320, MSCR Test Standard T350, and asphalt binder specification M322) were performed on a PQ 67-22 grade base binder from source number 2 and the base modified using traditional SOS wet process and the coated crumb rubber dry process described herein, made in a manner as described in Example 1. MSCR tests were also performed to determine Jnr and percent recovery values at 64° C.

TABLE 2

| PG 67-22 Base Binder | | | | |
|---|---|---|---|---|
| | Base | ECR #1 | ECR #2 | SBS D1101 |
| Blend ID | B10 | B 31 | B 32 | A63 |
| % Additive | 0 | 8.86 | 5.26 | 3 |
| Additive Type | 0 | ECR + PPA | ECR + PPA + G | SBS D1101 |
| PG Grade | PG 67-22 | PG 88-22 | PG 82-22 | PG 76-22 |
| True Grade | 68.69-25.41 | 88.85-25.23 | 82.29-24.92 | PG 77.9-23.2 |
| Phase Angle @ 76° C. | 88.1 | 76.2 | 80.6 | 77.1 |
| m-value (−12° C.) | 0.336 | 0.321 | 0.319 | 0.307 |
| MSCR % Recov at 3.2 kPa (64° C.) | 1.5 | 49.9 | 38.4 | 41.1 |
| MSCR Jnr at 3.2 kPa (64° C.) | 2.1 | 0.1 | 0.2 | 0.5 |

The data in Table 2 shows that the modified binder produced using the dry process (blended for 45 minutes at 163° C. at low shear using paddle mixer) performed well. This data demonstrates that ECR methodology discussed presently can be combined with polyphosphoric acid PPA alone and with PPA and Asphaltenes (trade name: Gilsonite) with the same base PG grade can be successfully modified using the technology described in the present invention. This indicates that the modified binder with the coated crumb rubber described here is equal or better (phase angle, both m-value and MSCR % recovery, and PG grade) than the traditional SBS modified binder at 3% level. m-value for the present dry mix coated crumb rubber additive is equal or greater than the traditional SBS modified asphalt binder (high shear mixing at 188° C. for 3 h).

Example 9

In this experiment, PG grade tests as per AASHTO M320, T350, and M322 (American Association of State Highway Transportation Officials Asphalt Binder Specification M320, MSCR Test Standard T350, and asphalt binder specification M322) were performed on a PG 64-22 grade base binder from source number 3 and the base modified using traditional SBS wet process and the coated crumb rubber dry process described herein, made in a manner as described in Example 1. MSCR tests were also performed to determine Jnr and percent recovery values at 64° C.

The data in Table 3 shows that the modified binder produced using the dry process (blended for 45 minutes at 163° C. at low shear using paddle mixer) performed well. This data demonstrates that a different source and a different base PG grade can be modified using the technology described in the present invention. This indicates that the modified binder with the coated crumb rubber described here is equal or better (phase angle, both m-value and MSCR % recovery, and PG grade) than the traditional Control CRMB and similar to the SBS modified binder at 3% level. The m-value for the ECR dry mix coated crumb rubber additive is equal or greater than the traditional Control CRMB and the SBS modified asphalt binder (high shear mixing at 188° C. for 3 h).

TABLE 3

| PG 64-22 Base Binder | | | | |
|---|---|---|---|---|
| | Base 2 | Control CRMB | ECR | SBS D1101 |
| Blend ID | B20 | B 11 | B 2D | A63 |
| % Additive | None | 10 | 10.31 | 3 |
| Additive Type | None | #30 CRM | ECR | SBS D1101 |
| PG Grade | PG 64-22 | PG 76-22 | PG 76-28 | PG 76-22 |
| True Grade | 66.77-26.86 | 79.99-22.12 | 79.80-29.90 | PG 77.9-23.2 |
| Phase Angle @ 76° C. | 89.1 | 84.7 | 77.5 | 77.1 |
| m-value (−12° C.) | 0.347 | 0.301 | 0.354 | 0.307 |
| MSCR % Recov at 3.2 kPa (64° C.) | 0.8 | 27.3 | 37.6 | 41.1 |
| MSCR Jnr at 3.2 kPa (64° C.) | 2.8 | 0.3 | 0.3 | 0.5 |

Figure 14:
FIG. 14 is a scanning electron microscope image of a substrate particle.
Figure 15:
FIG. 15 is a scanning electron microscope image of a composition in accordance with aspects of the present invention.
Figure 16:
FIG. 16 is a scanning electron microscope image of a substrate particle.

FIGS. 14-18 are scanning electron microscope images of compositions in accordance with principles of the present invention FIG. 14 shows at 50× magnification an uncoated regular crumb rubber. FIG. 15 shows a coated (solid elastomer) crumb rubber also at 50× magnification. Generally, FIGS. 14 and 15 show the crumb rubber particle and it is difficult to identify any areas of elastomeric coating. FIG. 16 shows at 180× magnification the uncoated regular crumb rubber. FIG. 17 shows the coated (solid elastomer) crumb rubber also at 180× magnification. In this figure, one can discern areas of elastomeric coating, which appear as lighter area in the figure.

Figure 18:
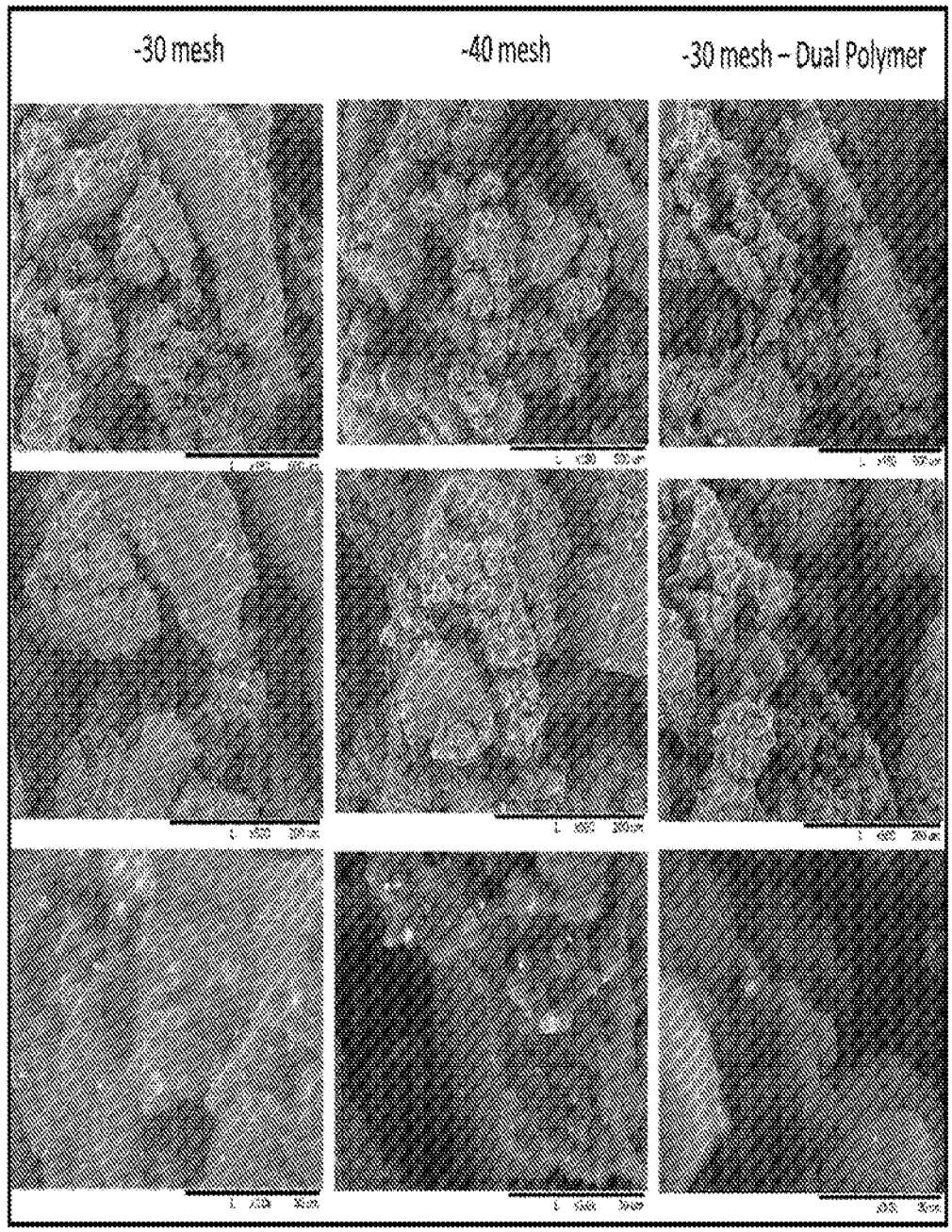
FIG. 18 is a scanning electron microscope image of various compositions in accordance with aspects of the present invention.

FIG. 18 shows the coated (solid elastomer) crumb rubber at three magnification levels. The top label over each column of three rows of Scanning Electron Microscope (SEM) micrographs represent the substrate untreated crumb rubber particle sizes. The label of '−30 mesh' indicates substrate crumb rubber particle size of less than 0.6 mm (passing ASTM Sieve Size of #30). Similarly, the label of '−40 mesh' indicates substrate crumb rubber particle size of less than 0.425 mm (passing ASTM Sieve Size of #40). However, the label '−30 mesh—Dual Polymer' refers to coating of a combination of 9% SBR and 3% SBS emulsion mixed with 88% untreated crumb rubber of less than 0.6 mm size (passing ASTM 30 mesh Sieve). As can be seen in the upper left micrograph (i.e., −30 mesh, ×180 magnification), a large uncoated surface of a crumb rubber particle can be seen. This surface appears in the upper portion, third quadrant from left-to-right of that micrograph. This flat surface may be contrasted with most other regions of the micrograph, which show knurled, uneven surfaces. These regions are where the elastomer coating has formed. A blend of SBR latex (9% by weight of untreated crumb rubber) and SBS emulsion (3% by weight of untreated crumb rubber) were mixed with −30 mesh untreated crumb rubber. In the right-hand column, it can be seen that both polymers were coated onto the crumb rubber particles.

Example 10

In this commercial production, one metric ton ECR was produced for minus #26 ASTM Sieve and minus #40 ASTM Sieve size untreated base crumb rubber. The base crumb rubber was manufactured by ambient grinding of recycled used truck tires. The #26 mesh crumb rubber was the ground material that passed the ASTM Sieve size of #26 (707 microns>#26 mesh>595 microns). The 40 mesh crumb rubber was the ground material that passed the ASTM Sieve size of #40 (420 microns>#40 mesh>345 microns).

The commercial ECR as set forth in this example was made by treating base untreated crumb rubber with a 40% solids content SBR emulsion (with water being the continuous phase) sold by Mineral China Inc. of Zibo City in Shandong Province PRC, 125 kilograms of SBR emulsion were added in a slow and steady stream (to reduce premature agglomeration of the SBR) to a 440 kg batch of untreated crumb rubber. In addition, 21.8 kg of SBS emulsion of 36% solids content that was purchased from Shandong Dashan Road and Bridge Company of Jinan in Shandong province PRC was also added. The two emulsions were added to the crumb rubber in a way which caused each emulsion to come into contact with the crumb rubber particles before the emulsion was exposed to a mixing force causing the emulsion to break. Paddle mixing resulted in a separation of the solid SBR and SBS from the continuous phase of the emulsion. The remaining continuous phase (water) was driven off during and after the mixing. During mixing the water is driven off by evaporation caused by mixing action, whereas, after mixing the water was driven off by allowing the ECR to dry by spreading a 1 to 2 inch layer on the warehouse floor. After mixing, solid SBR and SBS was adhered to the surface of the crumb rubber particles, causing the crumb rubber particles to become tacky/sticky. Next, 1.75 kg of powdered elemental sulfur (a rate of 0.2% per weight of the crumb rubber particles) was added as a cross linking agent. The slightly tacky nature of the combined crumb rubber/SBR/SBS facilitated adherence of the elemental sulfur to the surface of the particles. Each of the above described steps were carried out at room temperature.

A 1-ton capacity automatic horizontal paddle blender with a loading port at the top was used. Base crumb rubber was introduced from the top port hole and mixed continuously with the paddles. A slow and steady stream of the SBR and SBS emulsion (the emulsions were pre-blended before addition) were manually added from the same top port. Next, Sulphur powder was also manually added in a slow and steady stream to ensure even coating of particles. Once all the ingredients were added, the mixture was allowed to blend for one-and-half hours to ensure complete coating and mixing to produce ECR.

The ECR produced for both mesh sizes was then spread on the warehouse floor at a thickness of approximately 50 mm for drying purposes. All operations were carried out at room temperature.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An asphalt composition, comprising:
   a plurality of crumb rubber particles;
   a first coating layer comprising a solid elastomer disposed on the crumb rubber particles;
   a disulphide; and
   an asphalt binder.

2. The composition of claim 1, wherein the crumb rubber particles are recycled crumb rubber.

3. The composition of claim 1, wherein the solid elastomer is selected from the group consisting of styrene butadiene, styrene butadiene rubber, styrene butadiene styrene, chloroprene latex and terpolymer, and mixtures thereof.

4. The composition of claim 1, wherein the solid elastomer is styrene butadiene rubber.

5. The composition of claim 1, wherein the first coating layer further comprises a cross-linking agent selected from the group consisting of elemental sulfur, a sulfur donating compound, and mixtures thereof.

6. The composition of claim 1, further comprising a second coating layer, disposed on the first coating layer; the second coating layer including the disulphide.

7. The composition of claim 6, wherein the crumb rubber particles have a nominal diameter of 50 microns to 600 microns.

8. The composition of claim 6, wherein the coating layer encapsulates between 1% and 100% of the plurality of crumb rubber particles, and wherein the second coating layer encapsulates between 1% and 100% of the first coating layer.

9. The composition of claim 6, wherein the asphalt binder is hot asphalt binder or cold asphalt binder.

10. The composition of claim 6, wherein the asphalt binder is a polymer-modified asphalt binder.

11. The composition of claim 6, further comprising at least one of polyphosphoric acid or asphaltenes.

* * * * *